Oct. 16, 1956     H. HOFFMANN     2,766,738

INTERNAL COMBUSTION ENGINE

Filed July 8, 1954     2 Sheets-Sheet 1

INVENTOR
HEINRICH HOFFMANN

BY *Dicke and Craig*

ATTORNEYS.

United States Patent Office 2,766,738
Patented Oct. 16, 1956

2,766,738
INTERNAL COMBUSTION ENGINE

Heinrich Hoffmann, Stuttgart-Unterturkheim, Germany, assignor to Daimler-Benz Aktiengesellschaft, Stuttgart-Unterturkheim, Germany Application July 8, 1954, Serial No. 442,021
Claims priority, application Germany July 24, 1953
15 Claims. (Cl. 123—32)

The present invention relates to improvements in internal combustion engines, and more particularly to improvements in an engine of the prechamber type of injection with a main combustion chamber limited by a piston head, in which spiral projections and intermediate cavities are provided in the main combustion chamber by means of which the air compressed therein will be thoroughly agitated and intimately mixed with the fuel which may be injected into the main chamber either directly or indirectly.

It is one of the objects of the invention to provide the main combustion chamber with such spiral projections and depressions which are designed so as to give the air compressed within the cylinder a whirling motion to achieve a more intimate mixture thereof with the fuel or the prechamber jet, and hence to reduce the amount of residual air which would otherwise be insufficiently utilized for combustion purposes, and to permit the engine to operate more economically and free of smoke.

It is another object of the invention to design and obtain a combustion chamber which is as uniformly shaped as possible despite the spiral projections and depressions being provided therein.

Another object of the invention is the provision of means for increasing the temperature in the combustion chamber as much as possible.

A further object of the invention is to prevent the fuel in the central parts of the combustion chamber from impinging against the cylinder walls and from thus forming deposits thereon.

Still another object of the invention is to reduce the so-called knocking sound which occurs particularly when starting the engine or while running it at a low speed.

An important feature of the invention resides in designing the main combustion chamber so as to form a plate- or bowl-shaped depression in the piston head with spiral ribs projecting upwardly within such depression, and in suitably providing such ribs on the piston head and of a height sufficient to extend substantially to the plane of the piston edge so as to approach the bottom wall of the cylinder head as closely as possible when the piston is in its dead center position.

Another feature of the invention consists in injecting the fuel directly or indirectly into the main combustion chamber from the center or core of the spiral projections and intermediate cavities, and in providing the core of the spirals either concentrically or eccentrically with respect to the piston axis and, in doing so, preferably leaving a vacant space within such core into which the injection valve or prechamber will be able to project when the piston is in its upper dead center position. By such a construction it will be possible to distribute the fuel or the contents of the prechamber radially and uniformly upon the spiral sectors of the main combustion chamber.

Further objects, features, and advantages of the present invention will appear from the following detailed description thereof and the accompanying drawings, in which Fig. 1 shows an axial cross section through the main combustion chamber of a precombustion engine, said section being taken along line 1—1 of Fig. 2;

Figure 1:
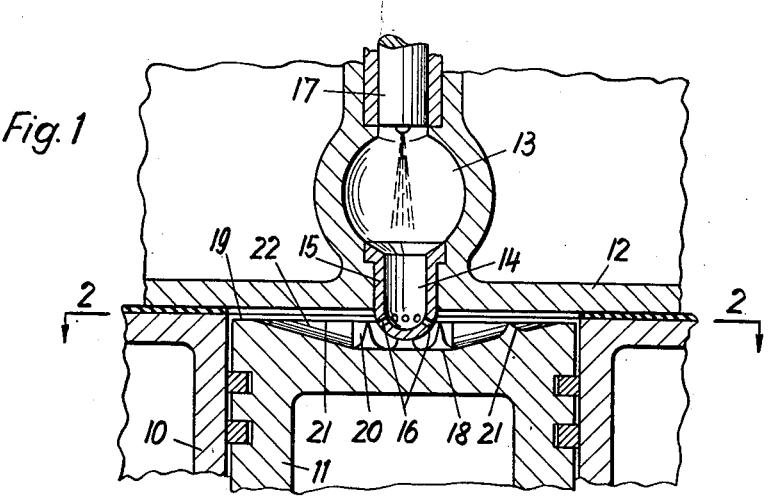

Referring particularly to Fig. 1 of the drawings, the cylinder block 10 contains the piston 11 which is adapted to reciprocate therein so that, when in the upper dead center position as illustrated, it will closely approach the bottom wall of the cylinder head 12 which terminates the cylinder chamber. In the water-cooled cylinder head 12, and, for example, intermediate four valves arranged in a circle, a precombustion chamber 13 may be provided which extends in the direction toward the main combustion chamber into a channel-like subchamber 14 formed by an insert 15 and communicating with the main chamber by a series of substantially radial ports 16. The fuel may be injected into the prechamber 13 in a known manner through an injection valve 17. The main combustion chamber is formed according to the invention by providing a bowl- or plate-shaped depression 18 in the piston head, such depression, as shown in Fig. 1, extending from the bottom thereof in a substantially straight line toward the level upper edge 19 of the piston, and the central part 20 thereof when in the upper dead center position being adapted to receive the prechamber insert 15 which thus projects into the main combustion chamber. Around this central space 20 and within the piston depression 18, the piston head is provided with ribs 21 of such height that their upper edges lie within the plane of the level piston edge 19, the ribs 21, as seen in a top view, are of spiral shape and extend outwardly from the periphery of the central space 20 either radially or at an angle deviating from such radius to some extent. Each of the sectors 22 thus formed by the ribs 21 and evenly distributed along the upper surface of the piston is preferably provided with a corresponding individual ports 16, may also extend radially similarly as shown chamber 13. In accordance with the gradual decrease in depth of the piston depression 18 toward the outside, the spiral sectors 22, while increasing in width, become gradually more shallow until in the vicinity of the peripheral wall of the piston they merge into the level piston edge 19, as indicated by the individual cross sections shown in Fig. 3.

Figure 4:
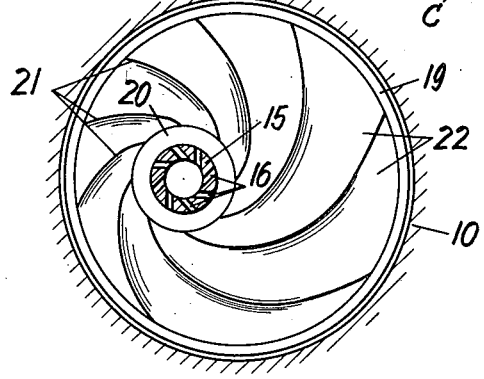
Fig. 4 shows a horizontal section similar to Fig. 2, but with the precombustion chamber located eccentrically with respect to the piston.

In the embodiment of the invention shown in Fig. 4, which is primarily designed for smaller engines, the prechamber is provided eccentrically with respect to the cylinder axis, and, for example, with two adjacent valves mounted in the cylinder head, and it may extend either parallel with or downwardly inclined relative to the cylinder axis. The insert 15 is likewise provided with ports 16 which extend into the central space or core 20 in such location and number that each of the spiral sectors 22 formed by the ribs 21 has its own port. Although these ports 16, may also extend radially similarly as shown in Fig. 2, in this particular case they are extending obliquely to the radial direction, i. e. more or less tangentially and in accordance with the spiral sectors 22.

Figure 5:
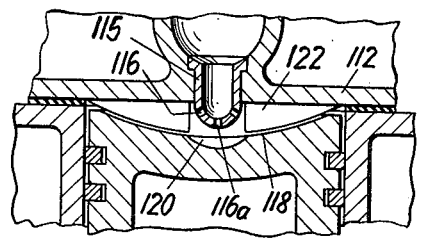
Fig. 5 shows an axial cross section through a modified embodiment of the invention with spiral ribs provided on the cylinder head.

Fig. 5 illustrates the ribs 122 provided in the cylinder head 112. The piston in this case has a simple depression 118 without any ribs, so that when in the upper dead center position the bottom of the piston depression 118 closely approaches the ribs 122. The insert 115 of the prechamber is provided with ports 116 and 116a, with the port 116a extending axially into the central space 120 which is formed by an additional depression in the piston, so that a part of the fuel will be brought to combustion within the central space 120. Otherwise, the embodiment of the invention shown in Fig. 5 will function in the same manner as that shown in Fig. 1.

Figure 6:
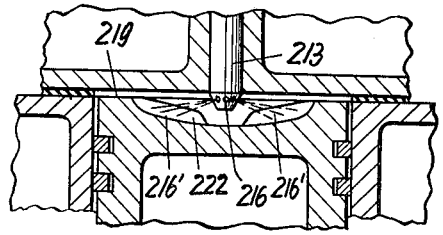
Fig. 6 shows an axial cross section through still another modification of the invention in which the fuel is injected directly into the main combustion chamber.

The modification illustrated in Fig. 6 differs from that shown in Fig. 1 primarily by providing in place of a prechamber an injection valve 213 whereby the fuel will be injected through individual ports 216 into the outer parts of the combustion chamber which are subdivided by ribs 222 to form spiral cavities. However, in this particular case the ribs 222 are lower in height than the outer piston edge 219 so that the fuel will partly be sprayed in the form of individual jets 216' over and beyond the ribs 222 into the outer parts of the spiral cavities.

Figure 2:
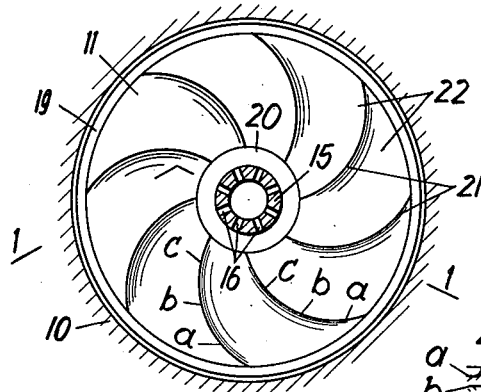
Fig. 2 shows a cross section taken along line 2—2 of Fig. 1.
Figure 3:
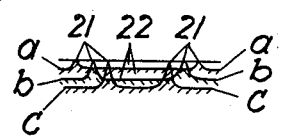
Fig. 3 shows several partial cross sections superimposed upon each other and taken along lines a—a, b—b, and c—c of Fig. 2.
Figure 7:
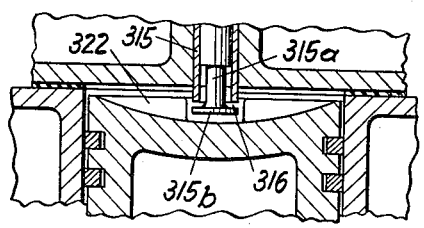
Fig. 7 shows an axial cross section through still a further modification of the invention in which the fuel is injected substantially uniformly in all directions.

The embodiment of the invention shown in Fig. 7, on the other hand, differs from that shown in Fig. 1 by providing the prechamber insert 315 with a core 315a which is connected with the outer parts of the insert by webs and carries on its outer end a plate 315b so as to form an annular slot 316 through which the fuel or the contents of the prechamber will be blown in the form of a homogeneous, umbrella-shaped or foglike jet into the outer parts of the combustion chamber which is subdivided by the spiral ribs 322 similarly as shown in Figs. 1 to 3.

While the foregoing description sets forth in detail what I regard as the preferred embodiment of my invention, it is to be understood that numerous changes may be made therein without departing from the spirit and scope of the invention as defined in the appended claims. Thus, for example, the ribs provided may be of a shape different from that shown and either of any arbitrary number or a number chosen in accordance with the size of the engine. Also, the number as well as the shape and direction of the ports provided does not necessarily have to comply with that of the spiral sectors but a different number of such ports may be chosen; they may also be made to extend in a direction or angle different from that shown, and may be shaped so as to obtain additional beneficial results.

Having thus described my invention, what I claim as new is:

1. An internal combustion engine comprising a cylinder block including an engine cylinder and a cylinder head, a piston having a depression in its upper end with its opening toward said cyinder head, the upper peripheral edge of said piston limiting said depression in outward direction and closely approaching said cylinder head when said piston reaches its upper dead center position, said depression together with the adjacent surface of said cylinder head forming the main combustion chamber of said engine, spiral projections with intermediate cavities within said depression, and means for injecting fuel into said chamber.

2. An internal combustion engine comprising a cylinder block including an engine cylinder and a cylinder head, a piston adapted to reciprocate in said cylinder, a shallow chamber intermediate said piston and said cylinder head, said chamber having a central portion and gradually decreasing in depth from said central portion toward its outer edge, spiral projections with intermediate cavities within said chamber, and means for injecting fuel into said chamber.

3. An internal combustion engine comprising a cylinder block including an engine cylinder and a cylinder head, a piston adapted to reciprocate in said cylinder, a main combustion chamber intermediate said piston and said cylinder head, the upper peripheral edge of said piston closely approaching said cylinder head and substantially enclosing said chamber when said piston reaches its upper dead center position, spiral projections with intermediate cavities within said chamber, said chamber having its deepest portion centrally thereof and decreasing in depth toward the peripheral edge of said piston, said spiral projections being provided on the piston head and of a height so that they will also closely approach said cylinder head in said dead center position, and means for injecting fuel into said chamber.

4. An internal combustion engine comprising a cylinder block including an engine cylinder and a cylinder head, a piston adapted to reciprocate in said cylinder, said piston having a depression in its upper end and the opening thereof toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, spiral projections with intermediate cavities within said depression, said projections having a height so that they will also closely approach said cylinder head in said dead center position, and means for injecting fuel into said chamber.

5. An internal combustion engine comprising a cylinder block including an engine cylinder and a cylinder head, a piston adapted to reciprocate in said cylinder, said piston having a depression in its upper end and the opening thereof toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, spiral projections with intermediate cavities on the upper surface of said piston within said depression and extending in a direction toward said cylinder head, said depression having its deepest portion substantially centrally thereof and decreasing in depth toward the peripheral edge of said piston, said projections having a height so that they will also closely approach said cylinder head in said dead center position, and means for injecting fuel into said chamber.

6. An internal combustion engine comprising a cylinder block including an engine cylinder and a cylinder head, a piston adapted to reciprocate in said cylinder, said piston having a depression in its upper surface and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, spiral projections with intermediate cavities within said depression, said projections and cavities extending outwardly from a common core toward the peripheral edge of said piston, and means coaxial with said core for injecting fuel into said chamber.

7. An internal combustion engine comprising a cylinder block including an engine cylinder and a cylinder head, a piston adapted to reciprocate in said cylinder, said piston having a depression in its upper end and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, said depression having a deepest portion, said portion forming a free space, spiral projections with intermediate cavities within said depression and extending outwardly from said free space toward the peripheral edge of said piston, and means for injecting fuel into said chamber and adapted to project into said free space when said piston is in said upper dead center position.

8. An internal combustion engine comprising a cylinder block including an engine cylinder and a cylinder head, a piston adapted to reciprocate in said cylinder, a main combustion chamber formed within the piston head and being open toward said cylinder head, spiral projections and intermediate cavities within said chamber, and means for injecting fuel into said combustion chamber including a prechamber located at least in part in said cylinder head opposite said main combustion chamber, and means for distributing the contents of said prechamber toward all sides of said combustion chamber.

9. An internal combustion engine comprising a cylinder block including an engine cylinder and a cylinder head, a piston adapted to reciprocate in said cylinder, said piston having a depression in its upper end and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, said depression having a deepest portion, said portion forming a free space, spiral projections with intermediate cavities within said depression and extending outwardly from said free space toward the peripheral edge of said piston, and means forming a prechamber for injecting fuel into said main combustion chamber, said last-named means projecting at least in part into said free space when said piston is in said upper dead center position, and having ports for distributing the contents of said prechamber toward all sides of said main combustion chamber.

10. An internal combustion engine comprising a cylinder block including an engine cylinder and a cylinder head, a piston adapted to reciprocate in said cylinder, said piston having a depression in its upper end and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, spiral projections with intermediate cavities within said depression, said projections and cavities extending outwardly from a common core toward the peripheral edge of said piston, and means coaxial with said core for injecting fuel into said chamber, said means comprising a series of ports in said cylinder head corresponding in number to that of said spiral cavities for uniformly distributing the fuel toward all cavities.

11. An internal combustion engine comprising a cylinder block including an engine cylinder and a cylinder head, a piston adapted to reciprocate in said cylinder, said piston having a depression in its upper end and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, said depression having a deepest portion, said portion forming a free space, spiral projections with intermediate cavities within said depression and extending outwardly from said free space toward the peripheral edge of said piston, and means forming a prechamber for injecting fuel into said main combustion chamber, said last-named means projecting at least in part into said free space when said piston is in said upper dead center position and having a series of ports extending in substantially the same direction as said spiral cavities for uniformly distributing the contents of said prechamber toward all cavities.

12. An internal combustion engine comprising a cylinder block including an engine cylinder and a cylinder head, a piston adapted to reciprocate in said cylinder, said piston having a depression in its upper end and the opening thereof directed toward said cylinder head, the upper peripheral edge of said piston limiting said depression in the outward direction and closely approaching said cylinder head when said piston reaches its upper dead center position, said depression together with the adjacent surface of said cylinder head forming the main combustion chamber of said engine, said depression having a deepest portion, said portion forming a free space, spiral projections with intermediate cavities within said depression and extending outwardly from said free space toward the peripheral edge of said piston, and means forming a prechamber for injecting fuel into said main combustion chamber, said last-named means projecting at least in part into said free space when said piston is in said upper dead center position and having a series of ports, each of said cavities communicating with at least one of said ports, said ports extending in substantially the same direction as said spiral cavities for uniformly distributing the contents of said prechamber toward all cavities.

13. An internal combustion engine comprising a cylider block including an engine cylinder and a cylinder head, a piston adapted to reciprocate in said cylinder, a combustion chamber formed within the piston head and being open toward said cylinder head, said chamber having a deepest portion forming a free space and gradually decreasing in depth toward the peripheral edge of said piston, a series of spiral projections and intermediate cavities within said chamber and extending outwardly from said free space, and an injection valve mounted in said cylinder head and projecting into said free space when said piston is in its upper dead center position.

14. An internal combustion engine comprising a cylinder block including an engine cylinder and a cylinder head, a piston adapted to reciprocate in said cylinder, a combustion chamber formed within the piston head and being open toward said cylinder head, said chamber having a deepest portion forming a free space and gradually decreasing in depth toward the peripheral edge of said piston, a series of spiral projections and intermediate cavities within said chamber and extending outwardly from said free space, and an injection valve mounted in said cylinder head and projecting into said free space when said piston is in its upper dead center position, said valve having a series of valve openings extending substantially in the direction of, and communicating with, said spiral cavities for uniformly distributing fuel toward all sides of said combustion chamber.

15. An internal combustion engine comprising a cylinder block including an engine cylinder and a cylinder head, a piston adapted to reciprocate in said cylinder, a combustion chamber formed within the piston head and being open toward said cylinder head, said chamber having a deepest portion forming a free space and gradually decreasing in depth toward the peripheral edge of said piston, a series of spiral projections and intermediate cavities within said chamber and extending outwardly from said free space, and means for injecting fuel into said chamber, said piston and free space extending eccentrically relative to said injecting means.

References Cited in the file of this patent

UNITED STATES PATENTS

| | | |
|---|---|---|
| 2,062,013 | Opolo | Nov. 24, 1936 |
| 2,231,392 | McCarthy | Feb. 11, 1941 |

FOREIGN PATENTS

| | | |
|---|---|---|
| 491,737 | Germany | Feb. 12, 1930 |